Figure 8A:
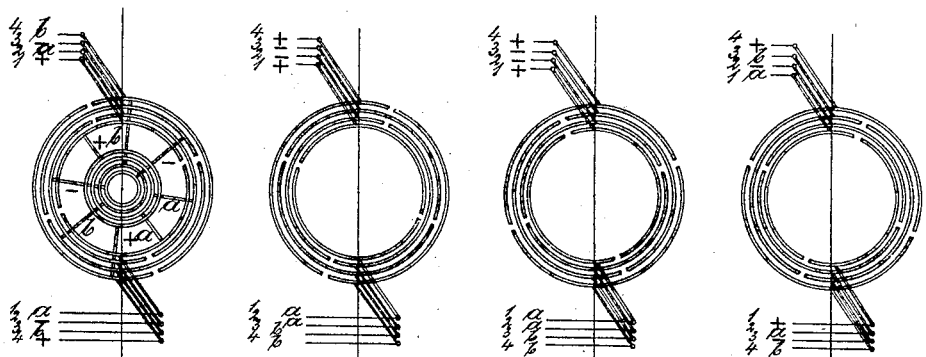
Figure 8B:
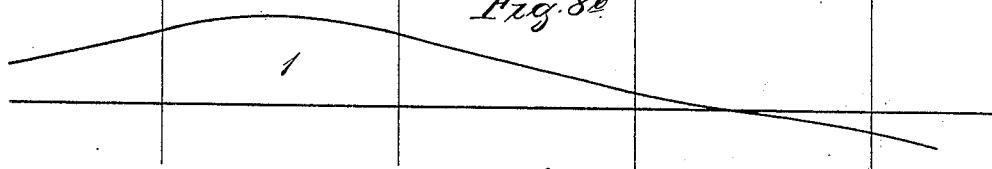

No. 823,055. PATENTED JUNE 12, 1906.
J. KRUYSWIJK.
TRANSMISSION AND DISTRIBUTION OF ELECTRIC POWER.
APPLICATION FILED AUG. 3, 1904.
10 SHEETS—SHEET 1.
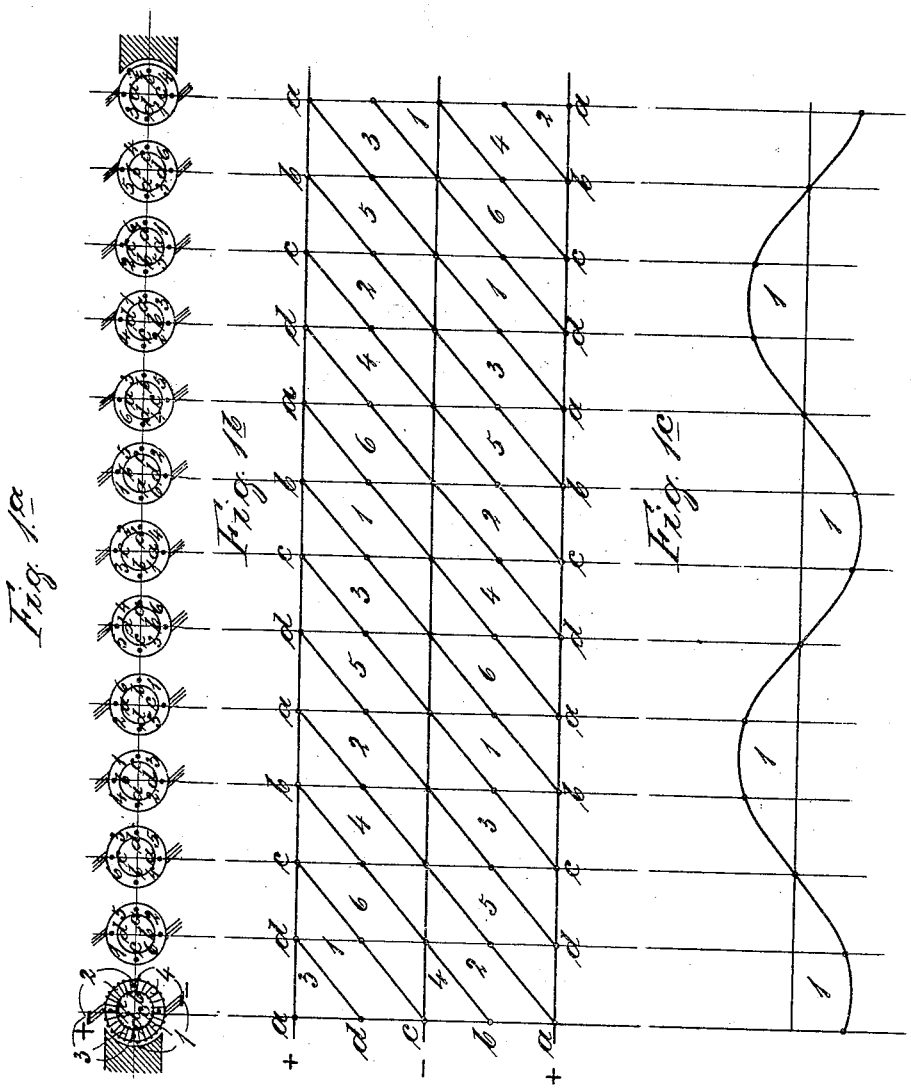
Witnesses:
Paul Wollenberg
Emil Kayser
Inventor
Jacob Kruyswijk
by Robert Heifald
Attorney.

No. 823,055. PATENTED JUNE 12, 1906
J. KRUYSWIJK.
TRANSMISSION AND DISTRIBUTION OF ELECTRIC POWER.
APPLICATION FILED AUG. 3, 1904.
10 SHEETS—SHEET 2.
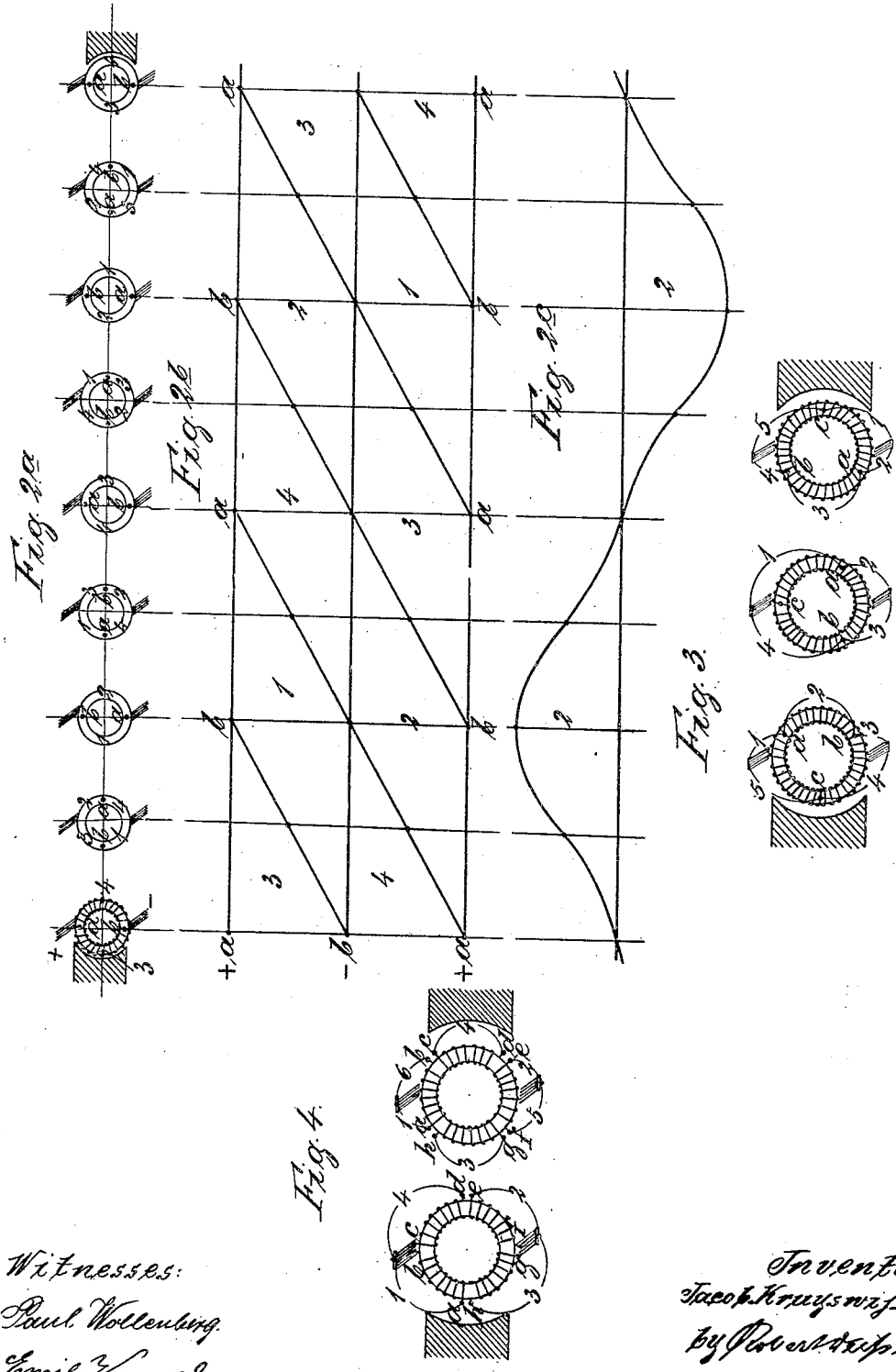

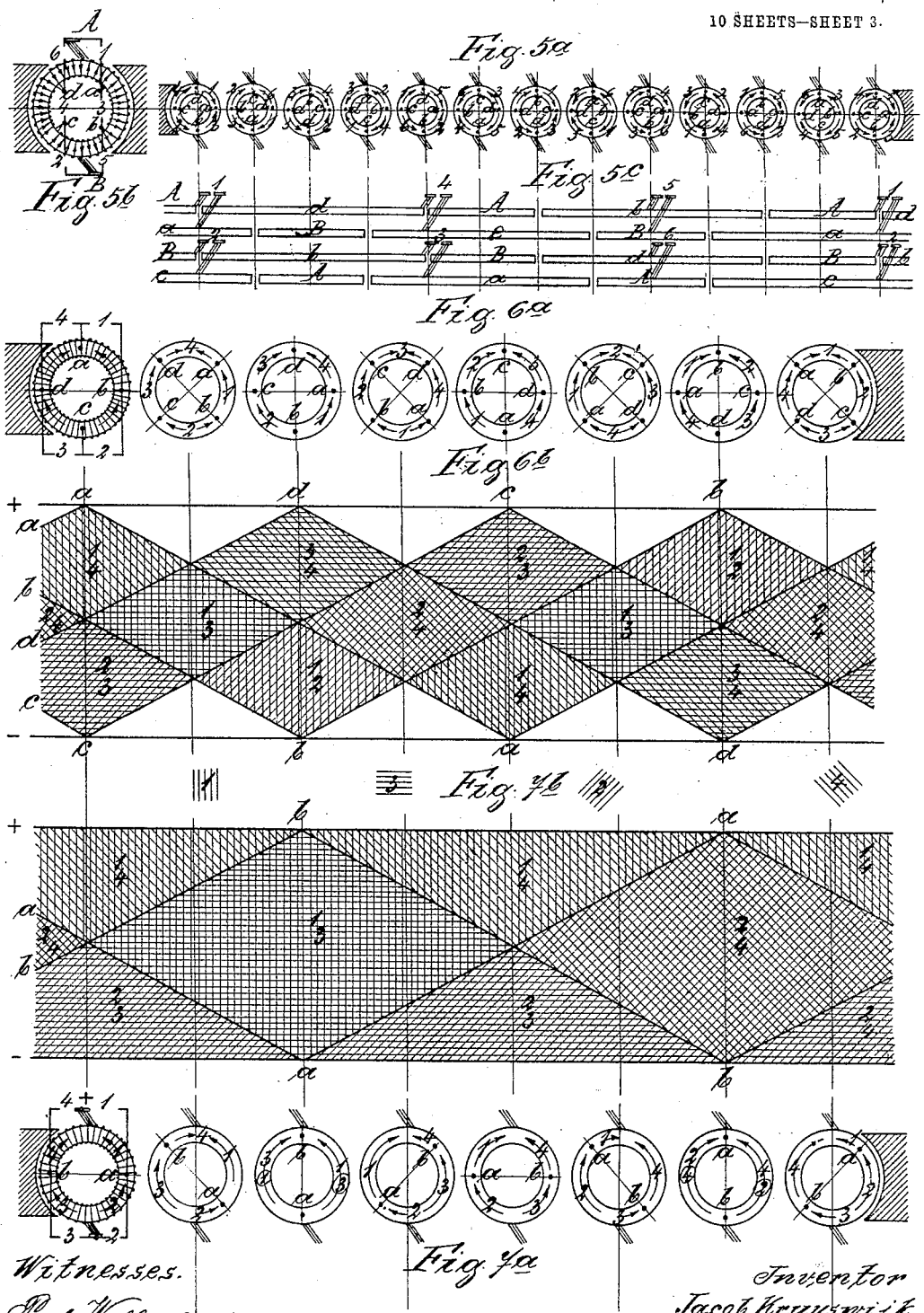

No. 823,055. PATENTED JUNE 12, 1906.
J. KRUYSWIJK.
TRANSMISSION AND DISTRIBUTION OF ELECTRIC POWER.
APPLICATION FILED AUG. 3, 1904.
10 SHEETS—SHEET 5.
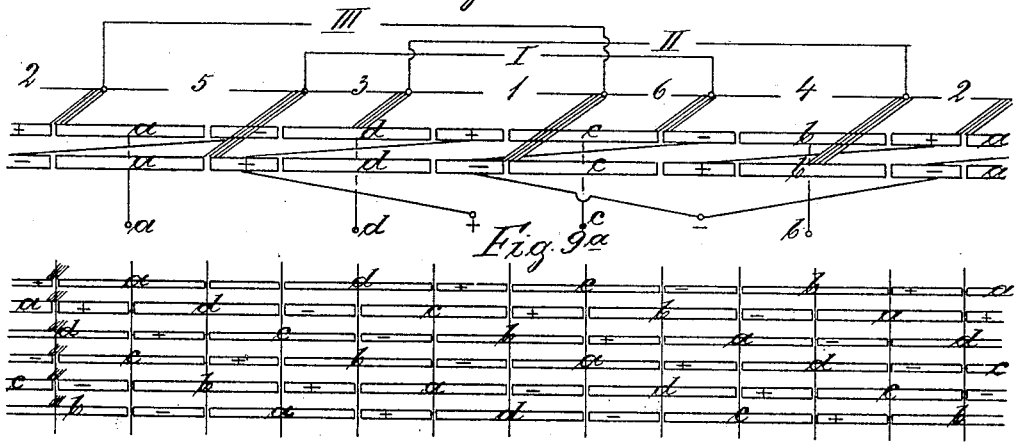
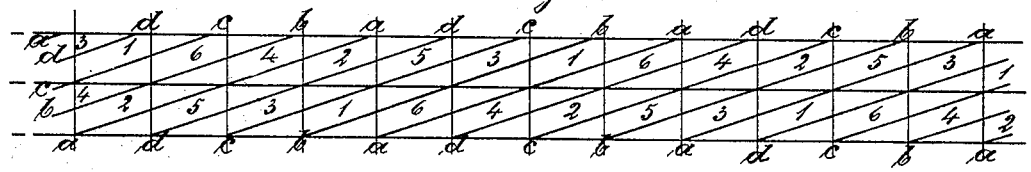
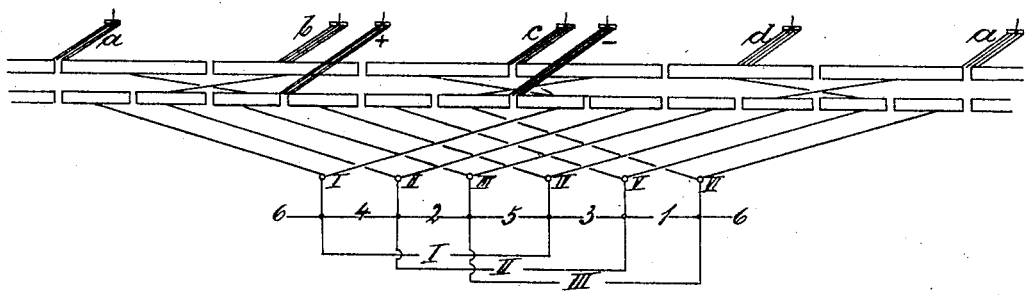
Witnesses:
Paul Wallenberg
Emil Kayser
Inventor
Jacob Kruyswijk
by Robert Keppler
Attorney.

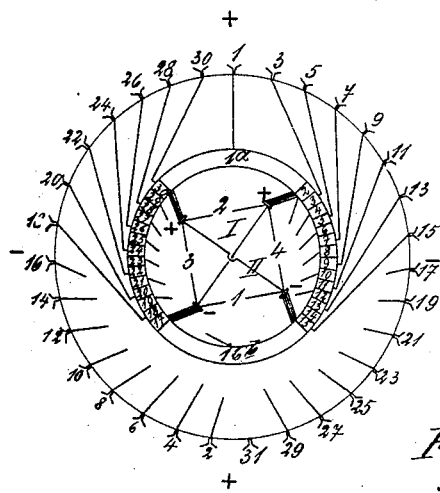

No. 823,055. PATENTED JUNE 12, 1906.
J. KRUYSWIJK.
TRANSMISSION AND DISTRIBUTION OF ELECTRIC POWER.
APPLICATION FILED AUG. 3, 1904.

10 SHEETS—SHEET 7.

Witnesses:
Paul Wollenberg
Emil Haysa

Inventor
Jacob Kruyswijk
by Robert Heißler
Attorney.

No. 823,055.  
PATENTED JUNE 12, 1906.
J. KRUYSWIJK.
TRANSMISSION AND DISTRIBUTION OF ELECTRIC POWER.
APPLICATION FILED AUG. 3, 1904.

10 SHEETS—SHEET 8.

Witnesses:  
Paul Wollenberg  
Emil Kayser

Inventor  
Jacob Kruyswijk  
by Robert Dressler  
Attorney

No. 823,055. PATENTED JUNE 12, 1906.
J. KRUYSWIJK.
TRANSMISSION AND DISTRIBUTION OF ELECTRIC POWER.
APPLICATION FILED AUG. 3, 1904.
10 SHEETS—SHEET 9.
*Fig. 16ª*
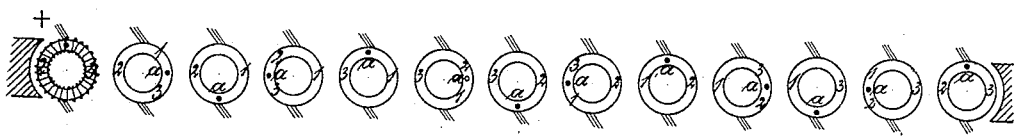
*Fig. 16ᵇ*
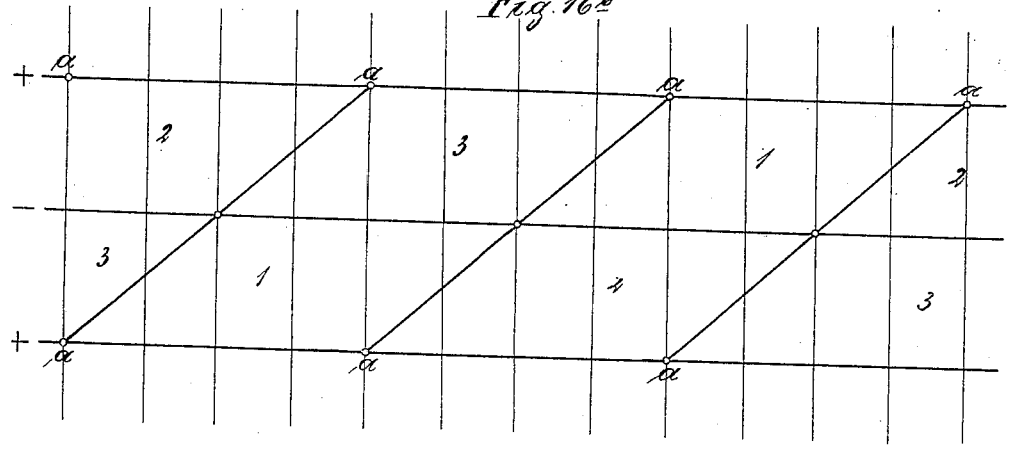
*Fig. 16ᶜ*
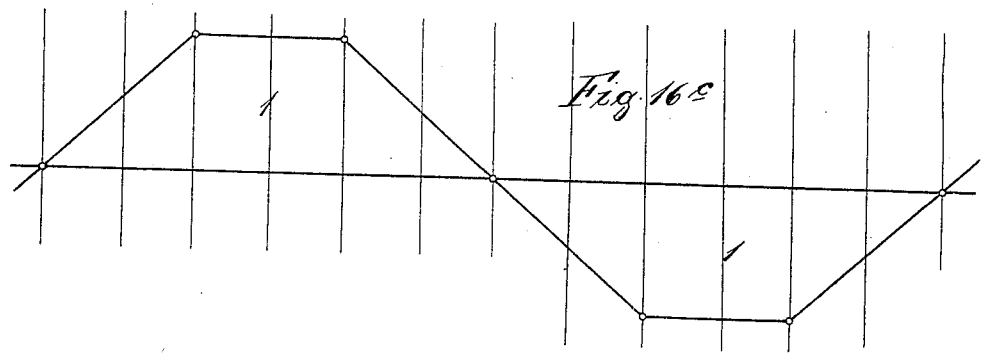
*Fig. 16ᵈ*
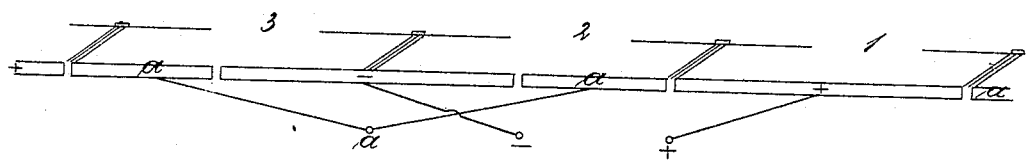
Witnesses:
Paul Wollenberg
Emil Kayser
Inventor
Jacob Kruyswijk
by Robert Ziepler
Attorney.

No. 823,055. PATENTED JUNE 12, 1906.
J. KRUYSWIJK.
TRANSMISSION AND DISTRIBUTION OF ELECTRIC POWER.
APPLICATION FILED AUG. 3, 1904.

10 SHEETS—SHEET 10.

Witnesses:
Paul Wallenberg
Emil Kayser

Inventor
Jacob Kruyswijk
by Robert Keipler
Attorney

UNITED STATES PATENT OFFICE.

JACOB KRUYSWIJK, OF RYSWIJK, NEAR THE HAGUE, NETHERLANDS.

TRANSMISSION AND DISTRIBUTION OF ELECTRIC POWER.

No. 823,055.     Specification of Letters Patent.     Patented June 12, 1906.

Application filed August 3, 1904. Serial No. 219,310.

*To all whom it may concern:*

Be it known that I, JACOB KRUYSWIJK, a subject of the Queen of the Netherlands, and a resident of Ryswijk, near The Hague, in the Kingdom of the Netherlands, have invented certain new and useful Improvements in the Transmission and Distribution of Electric Power, of which the following is an exact specification.

My present invention relates to a new and improved system of long-distance transmission of electric power, and has for its purpose to transmit the current from a continuous-current dynamo. For this purpose the current of a continuous-current armature is divided into a number of branch currents the phases of which form the complements to each other to the original continuous current of the armature. By transmitting these branch currents and recombining the same the whole current produced by the continuous-current armature is thus transmitted to a long distance, so that a continuous current equal to the full effect of the armature will result, except, of course, the unavoidable losses of transformation and transmission.

For economically transmitting the complementary currents the same must be transformed up to high tension. For transforming in stationary transformers or to allow of leading the current to closed collecting-rings if the transformation is effected in rotary transformers the direction of the current of the successive phases of the branch currents is constantly changed. Consequently after the transformation the direction of the currents must again be reversed, so that the phases become again of equal direction. If the current of the armature is divided in branch currents every two of which have constantly at the same time the same momentary values of tension, each of these current pairs is combined into a common circuit in transforming them, so that the transmission may be effected by as few conductors as possible. For the same purpose the circuits to be transmitted are connected to each other in star or delta connection.

A complete dividing of the armature-current into currents with complementary phases is obtained by deriving the current besides from the collector-brushes also from such a number of fixed points of the armature-winding that the winding is constantly divided into the desired number of circuits by these points of derivation and the neutral points from which the commutator-brushes lead off the current. Thus if in the simplest case—*i. e.*, in a two-pole ring-armature—radial lines are drawn through the current-deriving points and the neutral points in each position of the armature, except if two of these lines cover each other, the armature is divided by these lines in as many sections as there are complementary circuits derived. In order to obtain a symmetrical distribution of the current, the current-deriving points should be situated in equal distances from each other in the armature-winding. If these points are arranged by pairs diametrically opposite to each other, the derived circuits will have by pairs constantly the same momentary values of tension.

The accompanying drawings, Figures 1$^a$ to 17$^c$, illustrate the principles of the invention and show some constructional forms of the parts of it.

In Figs. 1$^a$, 1$^b$, 1$^c$ the dividing into $2 \times 3 = 6$ complementary circuits is represented. Fig. 1$^a$ shows the position of the current-deriving points in the successive armature positions. Fig. 1$^b$ shows graphically the course of the phases in the branch currents. In conformity with the two halves into which the current of the armature-winding is divided by the neutral lines two spaces are arranged above each other, each representing one half of the armature-current, which consequently represent together the continuous current furnished by the armature. The two outer lines and the middle line indicate the two poles of the armature. The lines which indicate the position of the distributing-points constantly go to and fro between these lines and need not cross each other in this kind of diagram.

For simplifying the drawings, the lines which connect the positions and the deriving-points in the neutral lines are indicated by straight lines. The six derived branch currents are indicated by the same numerals in Fig. 1$^b$ between the current-conductors, (brushes and deriving-points,) from which they are derived in the corresponding moments, and in Fig. 1$^a$ in the armature parts from which they take off the current. In Fig. 1$^c$ one of the derived branch currents is represented in the usual manner after reversing the phase. In Figs. 2$^a$, 2$^b$, 2$^c$ the distribution in $2 \times 2 = 4$ circuits of complementary phase is shown in the same manner for matter of comparison. The dividing of the current in $1 \times 5 = 5$ phases is represented in Fig. 3. The necessary position of the current-deriving points in armatures with drum-winding can easily be derived from the above.

In multipolar armatures as many groups of current-deriving points must be present as single points in a two-pole armature. In parallel-wound armatures those current-deriving points which constantly receive the same momentary values of tension with regard to the brushes can be connected to each other into a group. In armatures with series winding a similar connection is already made in winding the armature. With any kind of winding the number of current derivations need consequently not be greater than in a simple two-pole armature. Consequently each of the current derivations is in connection either with a single point or with a group of fixed points, according to the kind of armature. By the aid of the above indications the required current derivations with armatures of any kind of winding can easily be found out.

The armature-winding need not of necessity be a continuous-current winding. It may also be made up in separated parts—i.e., the continuous-current winding can be cut up into sections; but in this case the necessary distributing and reversing commutator is more complicated, as can be seen from such arrangements which are described below. In Fig. 4, for instance, two positions of a discontinuous winding for $2 \times 3 = 6$ circuits are represented. The parts of the winding can further be connected with each other in different manner. In Figs. $5^a$ and $5^b$, for instance, a winding for $2 \times 3 = 6$ phases is shown, with which the successive parts are wound in directions opposite to each other. At the brushes A and B there will in consequence not be present a constant tension of current. In the successive positions, in each of which two of the deriving-points constantly fall in the same axis with the brushes, the direction of the currents in the parts of the winding is indicated by arrows. In Fig. $5^b$ an intermediate position is shown in which all six circuits are under tension.

From the brushes and the fixed points the circuits must be derived in such a manner that the current of the armature is constantly distributed over the same.

A complete distribution of the current generated in the windings of an armature over a small number of circuits in such a manner that the currents obtained complement each other to a continuous current cannot be arrived at by simply deriving circuits from fixed points in a closed armature-winding or with an open armature-winding by connecting the ends of the winding simply to collecting-rings. The zero value of the phases is in this case caused by two points or winding ends from which a circuit is derived, being equidistant from a neutral line, so that currents of opposite direction are induced in this part of the armature. These currents neutralize each other and cannot at all be derived from the armature. As in consequence thereof the sum of the currents carried off by such circuits is not constant, the phases of these circuits cannot complement each other to a constant value.

In Figs. $6^a$, $6^b$ and $7^a$, $7^b$ for comparison with each other the derivation of $2 \times 2 = 4$ complementary branch currents and of $2 \times 2$ alternating currents generated in the usual way is shown. For sake of clearness the currents are derived from two-pole ring-armatures.

In Figs. $6^a$, $6^b$ and $7^a$, $7^b$ the identical successive armature positions are shown. In Figs. $6^b$ and $7^b$ the course of phases is graphically represented. The spaces between the horizontal lines represent the effect of the armature as a continuous-current armature. The effects produced by the two half-windings, one being situated at each side between the brushes, are thought as being superposed one upon the other, so that the two horizontal lines correspond to the poles of the armature. Between these, those lines which connect the successive positions of a current-deriving point with each other go constantly up and down. The spaces formed between the conductors from which the different circuits are derived (which spaces represent the phases of the currents derived) are hatched in a different manner. Within these spaces the circuits are indicated by numerals. In the armature positions in Figs. $6^a$ and $7^a$ those parts from which the currents are derived in the corresponding positions are indicated by the same numerals. From these diagrams it can easily be seen that the branch currents compensate each other by pairs exactly to half the effect of the armature. In deriving ordinary alternating currents, however, it can be seen that though the same complement each other by pairs to equal momentary values the sum of the four alternating currents, however, varies between the full value of the continuous current and a smaller value which is equal to the sum of the maximum values of two of the derived alternating currents of the same phase. The lines connecting the points in which one of the fixed deriving-points is situated in a neutral line are indicated by straight lines only for sake of simplicity. As is generally known, the sum of every two parallel alternating currents when at maximum value of the phase is greater than half of the continuous current, (being about three-fourths of the same.) Also from the armature positions according to Figs. $6^a$ and $7^a$ it can be seen by the position of the arrows indicating the current direction in the armature parts, from which the currents are derived in the successive positions, that by deriving ordinary alternating currents for each circuit twice during each revolution a position occurs in which in the windings of the corresponding armature part currents of opposite direction are induced which nullify each other. By dividing the current into branch currents forming the complements to each other, however, the full amount of the current induced in the armature is constantly derived.

With the dividing of the armature-current into $2 \times 2 = 4$ circuits these circuits can directly be derived from the commutator-brushes and collecting-rings to which the current derivations are connected and can then be conducted to the reverser. In the simplest form this reverser consists of a pair of segments for each circuit to be reversed. So with $2 \times 2$ circuits there must be provided four pairs of segments. The currents may be reversed in quite the same way. Of course the special manner in which the reverser and the rereverser are constructed is quite indifferent. In Fig. $8^a$ four positions of such a reverser are shown, corresponding to the second, fourth, sixth, and eighth positions of the armature in Fig. $7^a$. The four different circuits are indicated at the brushes by the same numerals as in the armature positions, and the potential which they successively attain is also indicated. In Fig. $8^b$ one of the circuits is shown in the ordinary way after reversion of the phases. In dividing the current into other than $2 \times 2 = 4$ circuits a special distributing-commutator is required. Such a commutator can also be employed in dividing into $2 \times 2 = 4$ phases. By the same the connection of a current-circuit with a brush and a derivation is then changed for the connection of the same circuit with another derivation and the opposite brush in the moment the phase is at maximum—i. e., the moment in which the current-deriving points are in the neutral lines. Such commutating is necessary if the current shall be derived in two single phases, as described below.

As already mentioned, the direction of the successive phases of the branch currents must constantly be changed to allow of an economical transformation in stationary transformers or of leading the branch currents to closed collecting-rings when rotating transformers are used. The two commutations—viz., the distributing and the reversing—can preferably be effected by one and the same commutator. In Figs. $9^b$, $9^c$, $9^d$, $9^e$, and $10^b$ and $10^c$ some constructional forms of such a combined distributer and reverser are represented. Such commutators can be put up in any desired manner, as the arrangement of the same is without importance. The only condition to be fulfilled is that the change or reversing takes place in the right moment—i. e., when short circuit between the brush and deriving-point is present. In Figs. $9^a$ and $9^c$ a commutator is shown by which the current is supplied to collecting-rings and taken off in alternating form from brushes, whereas in Figs. $9^d$ and $9^e$, on the contrary, the current is taken off by means of collecting-rings. In Fig. $9^a$ the six parts of which the simplified two-part commutator, Fig. $9^c$, is made up are separately shown. The segments are indicated with the signs of the current-conductors, with which they must be connected. The brushes are thought movable over the segments, so that they are constantly over the momentary values of the phases, as represented in Fig. $9^b$. The position of the brushes indicated in Fig. $9^c$ corresponds to the position of the brushes shown in Fig. $9^a$. In Fig. $9^d$ also the six parts are separately shown, from which the two parts of Fig. $9^e$ are composed, and the brushes which serve for current-supply are also thought movable over the segments. Those segments, which may be connected with the same collecting-ring, are indicated by the same numerals, (I to II.) The position of the brushes in Fig. $9^e$ corresponds to the position of the brushes indicated in Fig. $9^d$. Only in case of a suitable number of poles such commutators can directly be arranged upon the armature-shaft. In other cases they must be synchronously driven. The commutators represented can be arranged upon the shaft of a six-pole armature. In general the required number of revolutions of such commutators stands to the number of revolutions of the armature in the same proportion as the number of the pole pairs on the armature stands to the number of different phases derived, (half the total number of circuits in case of dividing into parallel circuits.) The circuits derived are indicated between the current-deriving devices of the commutators (brushes in Fig. $9^c$ and collecting-rings, Fig. $9^e$) by the same numerals (I to II) by which they are indicated in Fig. $9^b$.

As an example, a separate commutator only for distributing the current is shown in Fig. $5^c$. With this commutator the current shall be supplied by means of collecting-rings to be connected with the segments and is taken off by means of brushes. The necessary segments can be combined into four groups. The segments are indicated by the signs of the conductors with which they shall be connected. The brushes shown in the drawings are in a position which corresponds to the first armature position of Fig. $5^a$. Between every two brushes the circuits derived from the same are indicated by the same numerals as in the armature positions of Fig. $5^a$. In connection with an armature wound like that of Figs. $5^a$ and $5^b$ the branch currents are derived from this distributing-commutator in alternating form, as the successive parts of the winding are wound in opposite sense With an ordinary continuous-current armature, however, the branch currents would be of the same direction of phase.

Figure 14A:
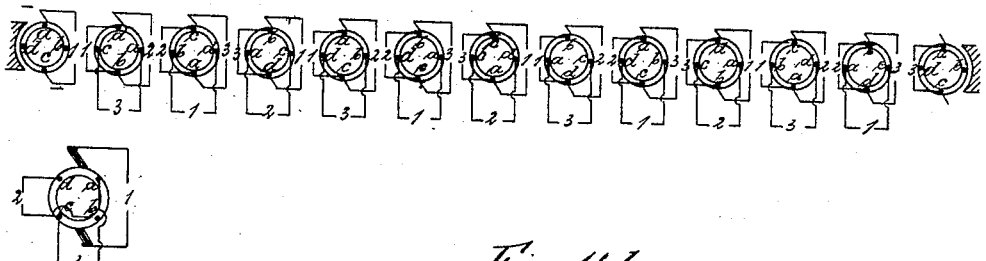
Figure 14B:
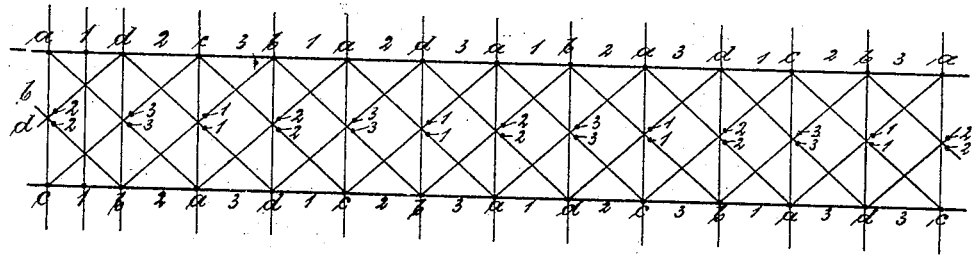
Figure 14C:
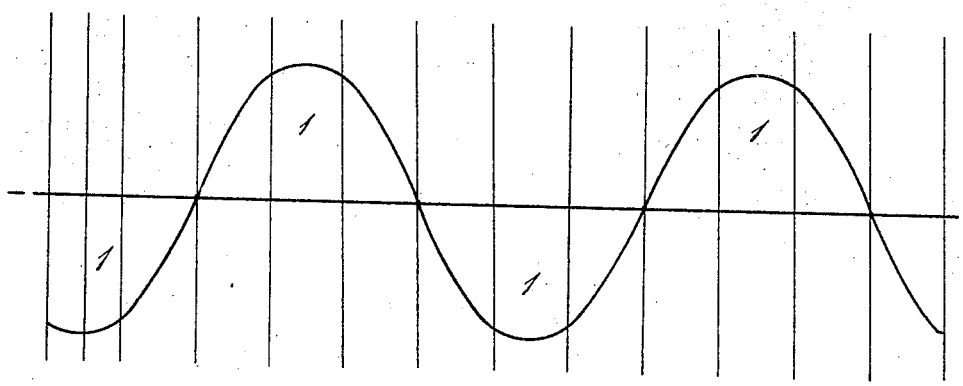

From the combined commutators like those shown in Figs. 9$^b$, 9$^c$, 9$^d$, 9$^e$ the whole current of the armature can be derived by means of three single circuits. The required connections of the brushes are indicated in Figs. 9$^c$ and 9$^e$ by the numbers I, II, and III, and in Figs. 14$^a$, 14$^b$, 14$^c$ the way of commutating by means of which the single phases are derived has fully been represented. From the diagram of Fig. 14$^b$ the course of the phases can be seen. Here the two halves of the armature-current are superposed so that they cover each other, and in consequence the lines which indicate the advancing of the direct deriving-points cross each other. The zero value of the current between two deriving-points is consequently indicated by the meeting of the corresponding lines. From this diagram it can be seen that such circuits are derived which are constantly alternately connected to a pair of current-deriving points and to the brushes, respectively. The three circuits which can be derived in that manner form the complements to each other to the full effect of the armature, as one of the same is alternately in connection with the brushes. In Fig. 14$^a$ the derivation of the three single circuits is indicated in the successive armature positions corresponding to the course of the phases in Fig. 14$^b$. In Fig. 14$^a$ the circuits are similarly numbered as the current-conductors (the brushes and the fixed points) in Fig. 14$^b$, from which the currents are derived in the corresponding successive positions. In Fig. 14$^c$ one of the current-circuits derived in this manner is represented in the usual way. For deriving two single circuits from the armature in the same manner the branch currents generated by means of two direct derivations must be commutated in a similar manner. Besides changing the direction of current in the zero-point of the phases the connection of a circuit with a deriving-point and a brush is changed for the connection of the same circuit with the other brush and the other deriving-point as soon as this deriving-point arrives in the same neutral line with the first brush, and vice versa.

Figure 10C:
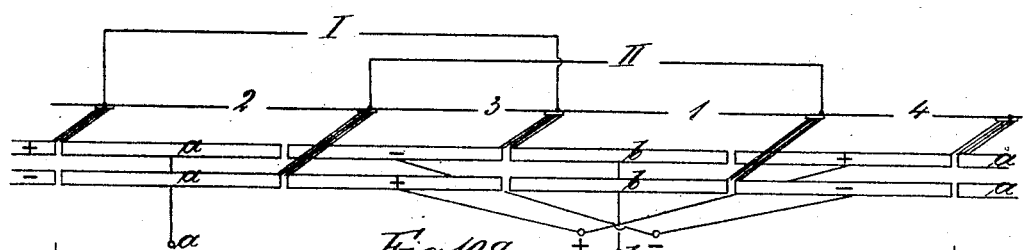
Figure 10A:
Figure 10B:
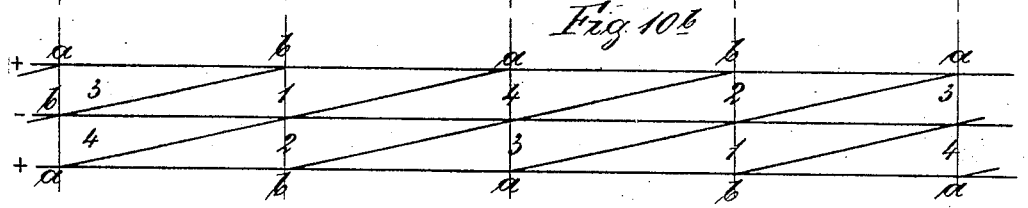

Figs. 10$^b$ and 10$^c$ show a commutator which is arranged in quite the same manner as that according to Figs. 9$^a$ and 9$^c$. Fig. 10$^a$ shows separately the four parts which are combined to two parts in Fig. 10$^c$. The position of the brushes in Fig. 10$^c$ corresponds to the position of the brushes shown in Fig. 10$^a$. Between the current-deriving brushes in Fig. 10$^c$ the circuits derived are indicated in the same way as in Fig. 9$^c$. By the larger numerals I II the required connection of the brushes for deriving the two single circuits is indicated.

Figure 15A:
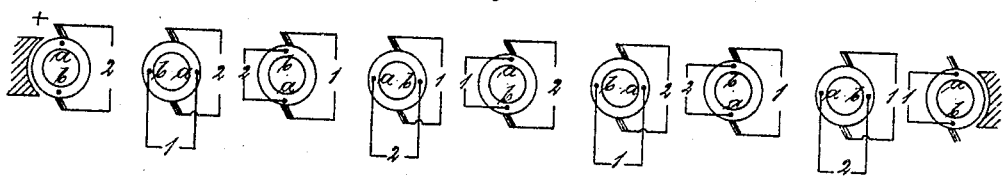
Figure 15B:
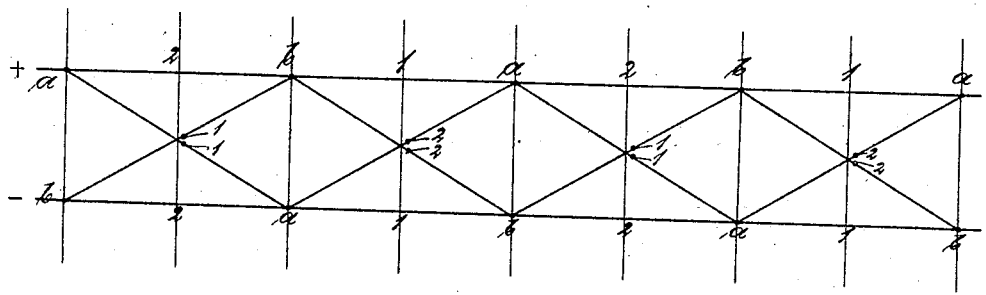
Figure 15C:
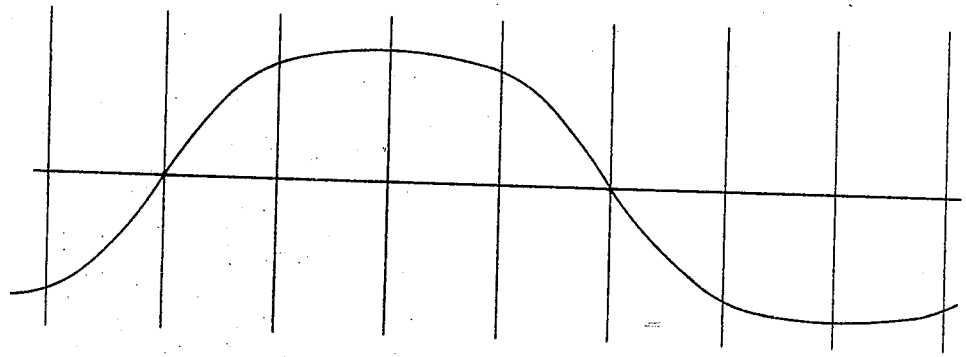

Figs. 15$^a$, 15$^b$, 15$^c$ show the way of commutating by which two single circuits are taken off in the same manner as is shown in Figs. 14$^a$, 14$^b$, 14$^c$ for three phases.

In Fig. 15$^c$ one of the circuits is again represented in the usual manner.

The original directing of the currents of the individual armature-coils to a continuous current can also be effected, together with the distributing and reversing of the branch currents, by means of one common commutating device. The branch currents can then be derived in alternating form directly from the armature-winding. When only the necessary connections are made in the right moment, the special constructional form of commutator is of no importance.

Some constructional forms are shown in Figs. 11$^a$, 11$^b$, 12$^a$, 12$^b$, and 13$^a$ 13$^b$. In these figures are represented around the combined commutators, and in the same succession in which they should be connected with an ordinary continuous-current commutator, the connected ends of every two successive coils of winding. The succession in which these ends are connected to each other by way of the windings is indicated by numerals. Figs. 11$^a$ and 11$^b$ show thirty-one connected ends of the coils of a four-pole series winding, and Fig. 12 shows the forty-eight ends of a six-pole parallel winding. These ends are connected with the segments of the commutators shown in the same succession in which they are connected with each other in the winding. As the armature of Fig. 12 is supposed to be parallel-wound, those connected ends of winding which constantly receive equal momentary values of tension with regard to each other are connected to common segments. Corresponding to the derivation of three or two phase currents, four ends in Fig. 12 and two such in Figs. 11$^a$ and 11$^b$ are connected with special segments in the required position. These segments have such a width that a brush applied to them remains connected with them for the time during which the deriving-points get from a neutral line across a field-pole to the following neutral line of the armature. Then the brush comes again in connection with the ordinary segments. All those connection-lines which would interfere with an easy understanding of the drawings are only partially drawn out, and the connections indicated by numerals. Within the commutators the pairs of complementary circuits and the single circuits of different phase are indicated by numerals between the brushes from which they are derived. The positions of the brushes, which are indicated in Figs. 11$^a$ and 11$^b$ and 12, correspond to the first armature position according to Figs. 1 and 2. The plus and minus signs indicated at the winding ends denote the polarity which brushes applied there would permanently receive. In Fig. 11$^a$ one of the connected ends of windings rests without connection with a segment, which is caused by the commutator shown being completely symmetrical. In the position of a brush upon the segments 30 and 1 two coils of the winding become short-circuited. According to Fig. 11$^b$ this will constantly be the case. With this way of connection only the alternate connected ends of winding are connected with a segment, and the number of segments consequently reduced to the half.

It is of course not possible to indicate and to describe all kinds of connections possible for the derivation of the currents from the armature-windings without the intermediacy of a common directing-commutator. From the examples described, however, the required connections for any kind of winding and number of poles and with commutators of different numbers of segments can easily be derived.

According to the described principle of constantly alternately connecting the circuits with the positive and negative commutator-brushes, the current of a continuous-current armature can be distributed over three single circuits by means of only one single current derivation. The current of half the armature-winding is then constantly distributed over two of the circuits, whereas a third circuit is derived from the brushes themselves. Figs. 16$^a$, 16$^b$, and 16$^c$ illustrate this kind of dividing of the current in the same way in which Figs. 1 and 2 illustrate the dividing into $2 \times 3$ or $2 \times 2$ circuits. In Fig. 16$^b$ the course of phases corresponding to the armature positions in Fig. 16$^a$ is shown. The circuits are indicated in the armature positions and in the diagram by the same numerals. In Fig. 16$^c$ a current-circuit is represented in the usual manner after reversing the phase. Also with this kind of current derivation a distributing-commutator is necessary. Fig. 16$^d$ shows a combined distributing and reversing commutator of the same kind as the one in Fig. 9$^c$ for $2 \times 3 = 6$ phases. The same need only consist of one part, which is always the case in dividing the current into an uneven number of circuits.

Figs. 13 and 13$^b$ show constructional forms of a commutator by means of which the three current circuits can directly be derived from the windings of the armature. The forty-four connected ends of the windings of a six-pole series-wound armature are connected in two groups with a kind of doubled-up commutator, so that constantly the alternate ends (counted through the windings) are connected with a commutator-segment. The doubling of the commutator is with $2 \times 2$, $2 \times 3$, and so on circuits only necessary in case the required number of poles is doubled on the armature, so as to have 8, 12, &c., poles. With $1 \times 3$ or in general with an uneven number of circuits this doubling of the commutator is required even with the smallest number of poles with which the immediate derivation of the complementary currents from the armature windings is possible—so, for instance, with six poles in case of $1 \times 3$ circuits. Each part of the doubled commutator then contains a broad segment, as shown in Fig. 13$^a$. Each of these is connected to one of two successive winding ends. They are not connected both to the same end in order to obtain a complete symmetrical arrangement of the commutator. In Fig. 13$^b$ a doubling of the number of segments of the commutator has been effected in the usual manner. The segments of equal value are connected with each other by cross connections; constantly every third following connected end of winding is connected with such a pair of segments. The two broad segments are in this case thus connected to the same winding end.

Figure 17A:
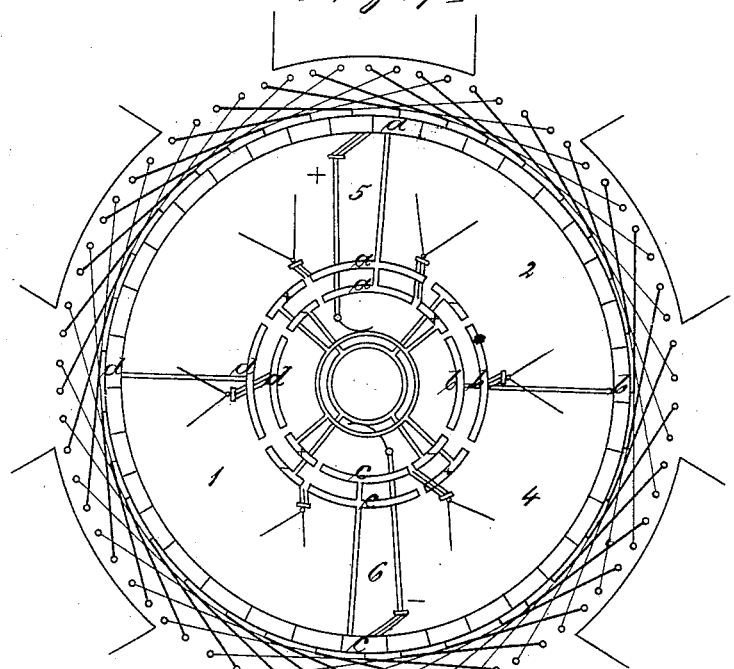
Figure 17B:
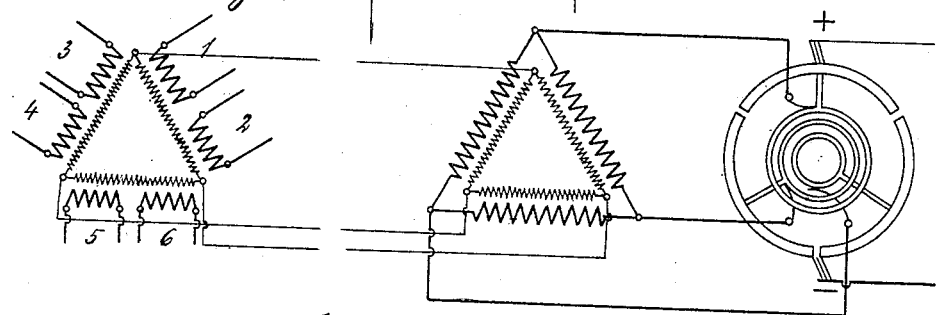
Figure 17C:
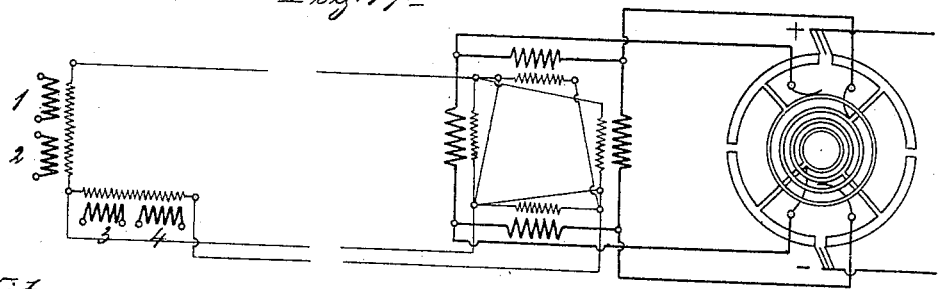

In Figs. 17$^a$ and 17$^b$ a complete transmission of continuous current after this system is shown, in which the current is transmitted in three-phase circuits. A six-pole armature is chosen, so that the combined distributer and primary reverser can be arranged directly upon the armature-shaft. As the armature represented is of series winding only two brushes (shown within the collector) are arranged, which are connected with the corresponding segments of the reverser by means of collecting-rings. The current derivations are made from segments of the collector in the required position by directly connecting these segments with the corresponding segments of the reverser. If the reverser were synchronously driven by special means, of course also these connections had to be made by means of collecting-rings. As the number of segments of the collector is a number not containing the factor 4, a somewhat unsymmetrical distribution of the armature-windings is caused. This want of symmetry could be overcome by making the direct derivations from symmetrical points in the winding itself.

In order to be able to transmit to a long distance the whole current by means of three conductors every two parallel circuits (circuits with constantly equal momentary values with regard to each other) are combined to a common secondary current-circuit in transforming them up. In the drawings these combinations have been indicated by inscribing the same numerals between the conductors of the six circuits upon the reverser and at the transforming arrangement, Fig. 17$^b$. As an example, the rereversing of the currents after transforming to low tension is effected by means of a commutator with which the circuits, connected with each other to a closed circuit, are connected in such a manner that at two points of the reverser diametrically opposed to each other constantly the sum of the tensions is present so that the continuous current can be taken off by means of two brushes. Of course also the rereversing of the currents can be effected close to the generator if it should be desired to only change the tension of a continuous current—i. e., to generate a continuous current of another tension than that which is present at the collector-brushes of the armature.

In redirecting after the manner described, the current-circuits must be connected with each other in series, so that in case the current is transmitted by two circuits a distribution of each transmitted phase over two separate circuits is necessary to allow of connecting with such a rereverser. In Fig. 17°, for example, such a transformation plant with transmission of the current in two current-circuits is indicated.

The rereversing of the branch currents can be effected for each consuming apparatus separately as well as for a number of such apparatuses in a group. Likewise the current-supply to the reversing-commutators can either be effected from common or from individual transformers. In connecting several generators parallel to each other for supplying a common transmission plant the current-conductors from the brushes and fixed points may be connected to a common distributing and reversing commutator if the individual armatures are arranged in such a manner that the resulting currents are of equal phase.

If it is thought preferable to transmit the branch currents to a long distance with phases of equal direction, the same should at once be rereversed after the transformation. A second reversing and rereversing is then necessary to allow of transforming to low tension in stationary transformers. Of course the branch currents with phases complementing each other to a continuous current can be used with alternating-current consuming apparatus (induction-motors and the like) in the same manner as alternating currents generated in the usual manner. Dynamos provided with armatures being provided with current derivations in the manner as described can further be employed as synchronous motors when driven by the branch currents.

Having thus fully described the nature of my invention, what I desire to secure by Letters Patent of the United States is—

1. In a system for transmitting electric power, the combination of a continuous-current dynamo having an armature, a commutator with brushes for deriving current from said commutator, collecting-rings and means for leading current from certain points of the armature-winding to the collecting-rings, with means for connecting said points of the armature-winding with the brushes by the intermediacy of separate circuits, so that the currents of these circuits complement each other to the total current generated in the armature, substantially as described and for the purpose set forth.

2. In a system for transmitting electric power, the combination with a continuous-current dynamo, having a commutator and brushes for deriving current from said commutator, of collecting-rings, means for leading current from certain points of the armature-winding to the collecting-rings, a dividing-commutator for dividing the current into complementary phases, a reversing-commutator for reversing the phases of said complementary branch currents, means for connecting the dividing and reversing commutators with the direct-current dynamo, and means for transmitting the current from the dividing and reversing commutators to a distance, substantially as described and for the purpose set forth.

3. In a system for transmitting electric power, the combination in the generating-dynamo of the direct-current commutator with the distributing and the reversing commutator, substantially as described and for the purpose set forth.

4. In a system for transmitting electric power, the combination with a continuous-current dynamo, having a commutator, and brushes for deriving current from said commutator, of collecting-rings, means for leading current from certain points of the armature-winding to the collecting-rings, a dividing and reversing commutator for dividing the current of said dynamo into a number of branch currents of complementary phases, and for reversing the phases of the complementary branch currents, means for connecting the dividing and reversing commutator with the brushes and collecting-rings of the direct-current dynamo, and means for transmitting the current from the dividing and reversing commutator to a distance, substantially as described and for the purpose set forth.

5. In a system for transmitting electric power, the combination of a continuous-current dynamo, having collecting-rings and a commutator with brushes, of dividing and reversing commutators for dividing the current of said dynamo into complementary branch currents and for reversing the phases of these branch currents, means for connecting the dividing and reversing commutators to said collecting-rings and brushes, an electric transformer connected to the dividing and reversing commutators, and means for transmitting the current from the transformer to a distance, substantially as described and for the purpose set forth.

6. In a system for transmitting electric power, the combination of a continuous-current dynamo, having collecting-rings and a commutator with brushes of dividing and reversing commutators for dividing the current of said dynamo into complementary branch currents, and for reversing the phases of these branch currents, means for connecting the dividing and reversing commutators to said collecting-rings and brushes, an electric transformer connected to the dividing and reversing commutators, a current-transmitting line, one end of which being connected to said transformer, a transformer connected to the other end of said line, and a rereversing-commutator connected to the latter transformer for rereversing the complementary currents transmitted by the line, substantially as described and for the purpose set forth.

In testimony whereof I have signed my name to this specification in the presence of two subscribing witnesses.

JACOB KRUYSWIJK.

Witnesses:
 BOUKE JACOB KRUYSWIJK,
 GENIT JAN VA WAVEIES.